G. W. CRISE.
FORE TRUCK FOR WHEEL SCRAPERS.
APPLICATION FILED NOV. 15, 1915.
1,177,491.
Patented Mar. 28, 1916.
2 SHEETS—SHEET 1.
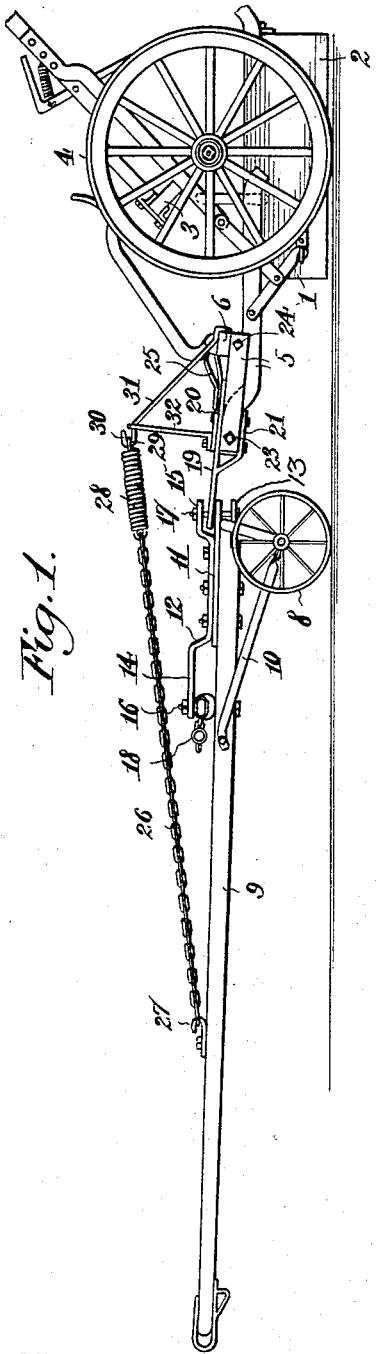
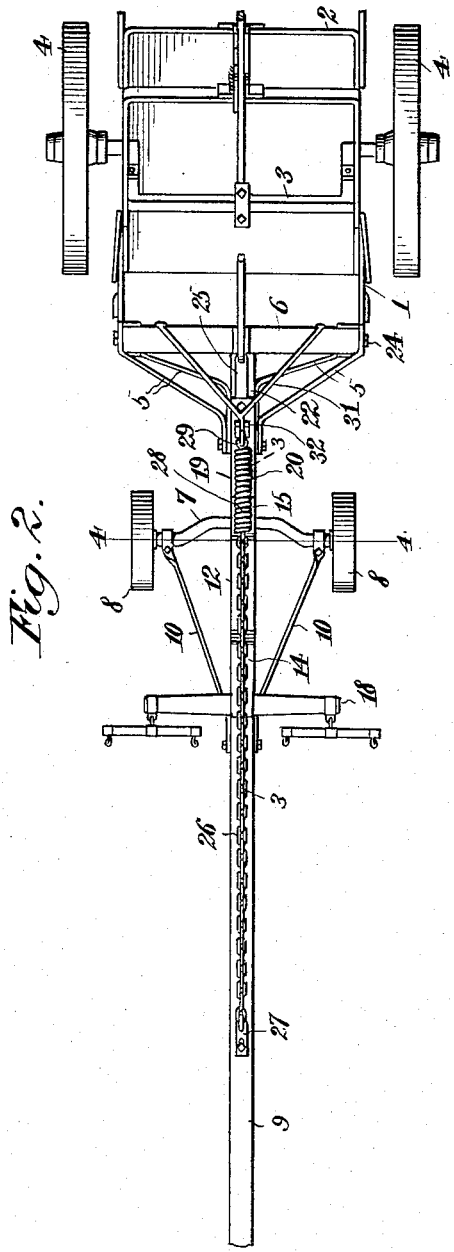
Inventor,
Grover W. Crise.
Witnesses:
C. Feinle, Jr.
L. C. Hines.
By Victor J. Evans,
Attorney.

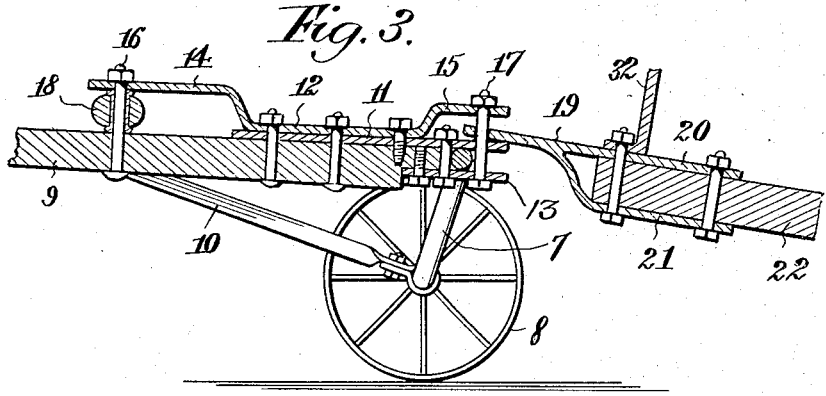
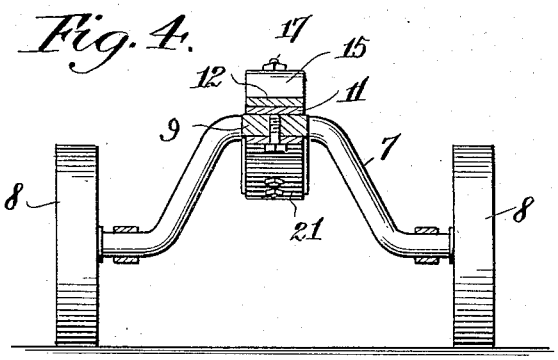
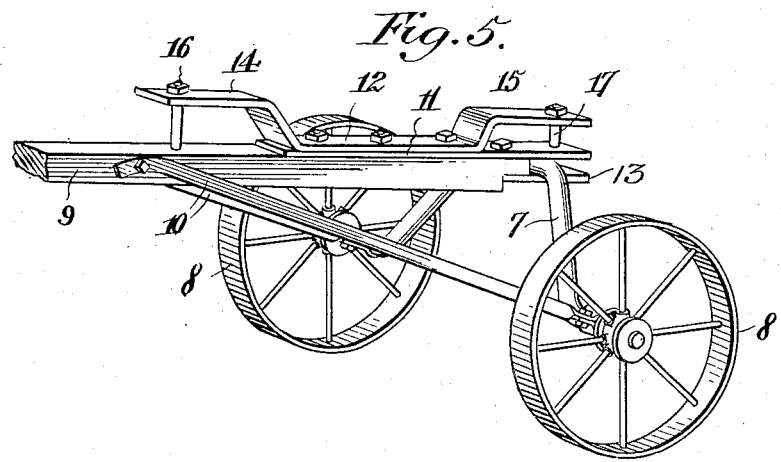

UNITED STATES PATENT OFFICE.

GROVER W. CRISE, OF LETTS, INDIANA.

FORE-TRUCK FOR WHEEL-SCRAPERS.

1,177,491.  Specification of Letters Patent.  Patented Mar. 28, 1916.

Application filed November 15, 1915. Serial No. 61,635.

*To all whom it may concern:*

Be it known that I, GROVER W. CRISE, a citizen of the United States, residing at Letts, in the county of Decatur and State of Indiana, have invented new and useful Improvements in Fore-Trucks for Wheel-Scrapers, of which the following is a specification.

This invention relates to an attachment for wheel scrapers of the two-wheel type, such as are commonly employed in road work, the object of the invention being to provide a fore-truck for such scrapers whereby certain objections are overcome and advantages gained, as hereinafter fully set forth.

It is well known that two-wheel dumping scrapers are advantageous in many kinds of cutting and filling in road work, particularly in being more conveniently handled in many situations. These kinds of scrapers, however, are objectionable to a high degree in one respect, to wit, in that they throw an excess amount of neck strain upon the draft animals, causing serious cases of sore neck, and also produce excessive tongue slashing, making them very hard upon the draft animals. In an attempt to remedy these objections, four-wheel scrapers are used, but these scrapers, in addition to being much more costly and complex in construction, are not as advantageous to use in many cases as two-wheel scrapers.

The object of my invention is to provide a fore-truck which may be applied to any ordinary type of two-wheel scraper with little or no changes in the construction of the scraper, and which will serve to give proper support to the draft tongue as well as control thereof, so as to relieve the draft animals both from neck strain and side slashing.

A still further object of the invention is to provide a fore-truck attachment for two-wheel scrapers which embodies means whereby the whole or greater portion of the weight of the tongue may be sustained from the body of the implement and the tongue controlled, rendering the implement much easier upon the draft animals.

With these and other objects in view, the invention consists of the features of construction, combination and arrangement of parts herein fully described and claimed, reference being had to the accompanying drawings in which:—

Figure 1 is a side elevation showing the application of my fore-truck to a two-wheel scraper of ordinary construction. Fig. 2 is a top plan view of the same. Fig. 3 is a vertical longitudinal section on line 3—3 of Fig. 2. Fig. 4 is a vertical transverse section on line 4—4 of Fig. 2. Fig. 5 is a perspective view of the truck detached.

Referring to the drawings, 1 designates a two-wheel scraper of any ordinary construction, provided with the usual dumping dirt pan 2, an arched axle 3, supporting wheels 4, and a frame including forwardly extending side pieces 5 connected at the front by a cross bar 6. To this cross bar is usually bolted the scraper tongue, which extends between and is also bolted to the forward parallel portions of the frame arm. It will of course be understood that in this type of implement the load weight falls upon the tongue sustained by the draft animals, and that owing to the freedom of motion of the scraper in passing over rough ground, etc., the animals are subjected not only to neck strain from the weight of the load, but also to slashing from sidewise movement of the tongue.

In carrying my invention into practice I provide a fore-truck comprising an arched axle 7 on the ends of which are journaled supporting wheels 8. The central part of this arched axle is fastened to the rear end of a main tongue 9, and said parts are connected and reinforced by braces 10. The wear plate 11 is applied to the upper rear surface of the tongue and is arranged beneath a draft iron 12, which is bolted therewith to the tongue. The rear end of the plate 11 projects beyond the end of the tongue 9 and disposed beneath this projecting end of the plate is the central portion of the arched axle, which is secured thereto by a suitable clip or clamping device 13. The front and rear ends of the draft iron are bent upward to form clevises 14 and 15 apertured for the passage of pivot bolts 16 and 17. To the clevis 14 may be attached suitable draft connections for the use of two or four animals, a double-tree 18 being shown in the present instance.

Pivotally connected at its forward end with the bolt 17 of the clevises 15 is a draft iron 19 having upper and lower arms 20 and 21 receiving the forward end of a stub or tongue 22, whereby the truck is adapted to be attached to the scraper, the stub tongue being employed to take the place of the usual tongue of the scraper. This stub tongue is attached to the frame arms of the scraper and to the cross bar 6 of said scraper by sets of bolts 23 and 24, and may be reinforced from the cross bar by a brace 25, the construction thus being such that the front portion of the scraper, and the weight of the load carried thereby, will fall upon the supporting wheels 8 of the fore-truck, thus relieving such weight of the load from the neck of the draft animals. It will be evident that the implement may be steered to the right or left by turning the truck on the pivot 17 between the front and rear sections thereof, the wheels 8 turning under the stub tongue, allowing the device as a whole to be steered and turned with ease and facility. Furthermore, the front truck opposes a resistance against sidewise deflection, preventing sidewise movement of the main draft tongue, and thus also relieving the draft animals of side slashing. To further assist in relieving the draft animals of neck weight and strain, and whatever little side slashing might otherwise exist, I provide a supporting and controlling connection between the front pivoted section of the truck and the rear rigid portion thereof, or the portion attached directly to the scraper. This connection comprises a link chain or its equivalent 26, which is adjustably connected at its forward end to an adjustable clip or fastener 27 on the main tongue and thence extends rearwardly and is provided at its rear end with a resilient section in the form of a coiled contractile spring 28 which is secured at its forward end to the rear end of the chain and is provided at its rear end with an eye 29 detachably engaging a hook 30 carried by a V-shaped bracket 31 fastened to the scraper frame, which hook seats in a notch in the upper end of a bracing standard 32 bolted to and rising from the stub tongue. It will be understood, of course, that this connection holds the main tongue supported at the desired elevation, the spring 28 yielding as required to prevent the tongue from threshing vertically, and that the height to which the main tongue may be adjusted, as well as the resistance of the spring, may be regulated by connecting different lengths of the chain with the hook or clip 27. This controlling connection, therefore, will not only support the main tongue and assist the truck proper in preventing the weight of the load from being thrown upon the necks of the draft animals, but will further serve to diminish whatever tendency there may be to a sidewise motion or lateral threshing of the tongue.

From the foregoing description, taken in connection with the drawings, the construction and mode of use of my improved fore-truck will be readily understood, and it will be seen that the invention provides a device of this character which may be applied to any ordinary type of two-wheel scraper with little or no change in the construction of the latter, and that it will support the scraper and the weight of the load and provide an implement which, in addition to possessing all the advantages of the ordinary scraper, will overcome all of the disadvantages stated in a ready and convenient manner.

I claim:—

A fore-truck for two-wheel scrapers comprising a two-wheeled frame, a draft tongue carried by said frame, a pivotally mounted stub tongue adapted to be fastened to the frame of the scraper, a bracket rising from and secured to the frame of the scraper, a brace for said bracket carried by said stub tongue, and a flexible longitudinal, extensible and contractible connection between the main tongue and said bracket for yieldingly holding said main tongue elevated.

In testimony whereof I affix my signature in presence of two witnesses.

GROVER W. CRISE.

Witnesses:
H. L. WILLIAMS,
W. A. TAGGART.

Copies of this patent may be obtained for five cents each, by addressing the "Commissioner of Patents, Washington, D. C."